United States Patent [19]

Heilenz

[11] E Re. 31,592

[45] Reissued May 29, 1984

[54] METHOD AND APPARATUS FOR OPERATING A WATER-JET PUMP

[76] Inventor: Siegfried Heilenz, D-6300 Giessen-Kleinlinden 1, Fed. Rep. of Germany

[21] Appl. No.: 409,482

[22] Filed: Aug. 19, 1982

Related U.S. Patent Documents

Reissue of:

[64] Patent No.: 4,310,287
Issued: Jan. 12, 1982
Appl. No.: 95,132
Filed: Nov. 16, 1979

[30] Foreign Application Priority Data

Nov. 18, 1978 [DE] Fed. Rep. of Germany ..... 2850142

[51] Int. Cl.[3] ..... F04F 5/44

[52] U.S. Cl. ..... 417/54; 417/87; 417/125

[58] Field of Search ..... 417/54, 77, 79, 87, 417/125, 173; 62/86

[56] References Cited

U.S. PATENT DOCUMENTS

| | | | |
|---|---|---|---|
| 475,111 | 5/1892 | Henderson et al. | 417/87 |
| 2,249,621 | 7/1941 | Schlumbohm | 62/86 |
| 2,702,664 | 2/1955 | Pienaar | 417/77 |

FOREIGN PATENT DOCUMENTS

| | | | |
|---|---|---|---|
| 75041 | 12/1918 | Austria | 417/77 |

*Primary Examiner*—Richard E. Gluck
*Attorney, Agent, or Firm*—Flynn, Thiel, Boutell & Tanis

[57] ABSTRACT

A method for operating a water-jet pump, in which the water needed for operation of the pump is recirculated in a cycle. The water is pressurized by means of compressed air at a substantially constant air pressure and the compressed air is used to drive out the water through the water-jet pump. Expanding the compressed air in a defined expansion space withdraws heat from the water by absorbing such heat in the air during and after its expansion. Apparatus for operating a water-jet pump includes a pair of ejecting receptacles and a first water valve for alternate connection of the ejecting receptacles to the pressure side of the water-jet pump. Second water valves return to the ejecting receptacles water which has been discharged from the water-jet pump. A first compressed air valve connects a compressed air source alternately to the ejecting receptacles and a second compressed air valve alternately connects the ejecting receptacles to an expansion vessel for expanding and thereby dropping the pressure of compressed air from the connected one of the ejecting receptacles. Expansion of the compressed air in the expansion vessel cools the water circulated through the water-jet pump, in one embodiment by immersion of the expansion vessel in such water and in another embodiment by spraying of a portion of such water into the expansion vessel.

24 Claims, 9 Drawing Figures

59
56
60
8
9
68
61a
JET PUMP
31
65
JET PUMP
62a
64
61
66
63
62
33
32
34
28
16
3
2
25
26
27
20
21
19
22
23
24
24a
15
14
17
13
18

METHOD AND APPARATUS FOR OPERATING A WATER-JET PUMP

Matter enclosed in heavy brackets [ ] appears in the original patent but forms no part of this reissue specification; matter printed in italics indicates the additions made by reissue.

FIELD OF THE INVENTION

The invention relates to a method for operating a water-jet pump, in which the water which is needed for the operation of the pump is recirculated in a cycle.

BACKGROUND OF THE INVENTION

Water-jet pumps are for example used extensively in laboratories, for example for drying of substances or for evaporating of solutions at a low temperature, through which a thermal load on the substances to be treated is avoided. Water-jet pumps have the advantage that they are built very simply, practically have no wear and are practically insensitive against corrosion, if they are, as common, manufactured of glass or of plastic. A moderate vacuum can be produced without difficulties with water-jet pumps in the range of between 100 mm. mercury column and 15 mm. mercury column, which is sufficient for many laboratory purposes.

Disadvantageous, in comparison with mechanical pumps, for example rotary slide valve pumps, is the relatively high operating cost, since the water usage is considerable; a usual consumption value is for example 0.8 $m^3/h$, so that during a ten-hour operation 8 $m^3$ water are used. Aside from cost, such a high water consumption is also undesirable in view of the environmental resources. To avoid the water consumption, one has already used the above-mentioned method, according to which the water is recirculated in a cycle. For this, an electrically driven recirculating pump is used to place water, which runs off from the water-jet pump, again under pressure and feed it to the operating water connection of the water-jet pump.

The pressure reachable depends strongly on the temperature of the operating water, since the pressure can never be less than the steam pressure of the operating water, which increases with an increase in the temperature of the operating water. The operating water heats up relatively quickly in a recirculating system, so that the suction capacity of the water-jet pump is less than with a constant supply of fresh water. If one still wants to achieve lower temperatures, then the operating water must be cooled with special cooling devices. In this case, a complex apparatus with many electrical connections is the result.

The purpose of the invention is to provide a method of the above-mentioned type such that electrical installations are not needed and still a cooling of the operating water is achieved. Through a further development of the invention an advantageous apparatus for carrying out the method is also to be created.

SUMMARY OF THE INVENTION

This purpose is attained according to the invention by the water being pressurized by means of compressed air at a substantially constant air pressure and by the compressed air, which was used for driving water out through the water-jet pump, being expanded, i.e. allowed to drop in pressure, in a defined let-down, or expansion, space, wherein heat is withdrawn from the water, which is absorbed from the air during and after its expansion.

In place of a recirculating pump, compressed air is used for recirculating the water. Compressed air connections are generally at every work station in modern laboratories, so that setting up a special compressor is not needed. Inventively, the air does not drop in pressure during the driving out of the water, so that a constant water pressure exists at all times at the water-jet pump and thus a constant suction level, or rate, exists. When the compressed air has fulfilled its driving-out function, it is used inventively to cool the operating water to be recirculated. The expansion of the air, which after the driving out is still under high pressure, greatly cools the air. This cooling off is utilized to withdraw heat from the operating water. One therefore can maintain, without any special cooling equipment a low temperature of the recirculating water and thus is able to achieve a low pump pressure. Furthermore, the cooled operating water can be guided in an auxiliary cycle through cooling traps and can there replace the otherwise needed fresh water. Since both the recirculation of the operating water and also the cooling off of the operating water are done with compressed air, no electrical equipment is needed. This is particularly advantageous for a laboratory, since electrical installations would have to be protected particularly against wetness.

Above and hereinafter reference is made to water-jet pumps and compressed air as driving gas. The invention of course includes also methods, in which other liquids are utilized instead of water for the operation of the pump and in which gases other than air are utilized for the driving of the liquid. Other liquids and gases may be necessary in the case of special tasks.

The withdrawal of heat from the water can be effected by recirculating water around the expansion vessel, for example by arranging it in a water bath in an outer container. A particularly good efficiency is achieved, however, if the expanding air comes directly into contact with the water to be cooled, which can be achieved easily by introducing water through a nozzle into an expansion vessel, which water is then torn into droplets through the expanding air.

By alternately filling two ejecting receptacles, one obtains continuous operation on the water-jet pump since a driving-out, or discharging, operation can be followed directly by a further driving-out operation, without need to pause for filling of the ejection chamber with water.

The arrangement of the ejecting receptacle and of the expansion vessel in an outer container has the advantage that pipelines are hardly needed, since the ejecting receptacles can be filled directly from the outer container. By using check valves, in particular valve caps, the static pressure in the outer container effects a filling of the ejecting receptacles by which special filling means for filling the ejecting receptacles are avoided. A particularly simple means for the alternate connection of the ejecting receptacles to the water-jet pump employs a slide valve driven by the water leaving the ejecting receptacles. If one of the ejecting vessels has become pressureless, the piston of the slide valve is moved quickly by the pressure in the other receptacle, so that the emptied receptacle is closed off and now the receptacle which is under pressure is connected to the water-jet pump.

For reasons of simplicity, reference is here made to one water-jet pump, even though of course several water-jet pumps can be connected to the apparatus. Favorable size relationships for the apparatus are achieved if it is designed for the operation of two to four water-jet pumps.

The arrangement of standpipes and compressed air supply hereafter described assure water discharge without the danger of driving compressed air also flowing to the water-jet pump. However, one could also choose the arrangement differently. It is also not impossible to permit the driving compressed air to exit below the water level.

A reversing mechanism permits, with the simplest means, an automatic continuous operation of the apparatus such that the water-jet pump is supplied uninterruptedly with operating water.

The control of the compressed air by means of rotary slide valves can be done simply. However, other advantages are also to be considered. Particularly simple becomes the construction, when one single rotary slide valve controls both the supply of compressed air to the ejecting receptacles and also the transfer of air from the ejecting receptacles into the expansion vessel. To drive the rotary slide valve it is possible to use the above-mentioned reversing piston.

A particularly advantageous type of construction is obtained if one combines the compressed air lines and valves and water channels in a control plate, which is utilized at the same time for holding the ejecting receptacles and expansion vessel in the outer container.

It is also advantageous to arrange a water-jet pump or several water-jet pumps on the wall of the outer container, because through this pipelines for returning the operating water are eliminated. However, one also can arrange the water-jet pump at a different place and return the water through lines, for example hoses.

The alternate filling and emptying of the ejecting receptacles can be controlled also with a time-dependent control, through which after a pregiven, preferably adjustable time interval a switching over from one driving-out vessel to the other one takes place, whereby the time interval is chosen such that the switching over takes place for sure prior to the ejecting receptacle, which is emptying, becoming totally empty.

If one brings the expanding air directly into contact with the water, one can advantageously arrange the expansion vessel above the water fill and discharge the water and the expanded air at the lowermost point of the expansion vessel to assure in a simple manner the avoiding of an accumulation of water in the expansion vessel.

If one introduces water at a right angle to the expanding compressed air, one achieves a particularly intensive and thus effective contact between the air, which is cooling off, and the water. The air flow thereby tears the water into small droplets. Atomization of the water is also already effected by spraying it into the expansion vessel, whereby also its impact on solid surfaces assists its separation into small droplets. The cooling effect in the expansion vessel can be improved substantially if one builds in baffle plates. Furthermore, one achieves with such baffle plates a sound muffling.

BRIEF DESCRIPTION OF THE DRAWINGS

One exemplary embodiment of the invention is schematically illustrated in the drawings, in which.

DETAILED DESCRIPTION

Figure 7:
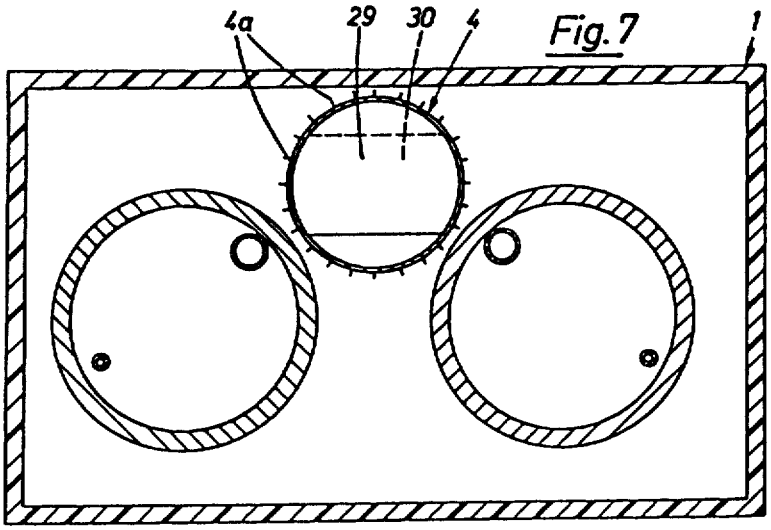
FIG. 7 is a cross-sectional view along the line VII—VII of FIG. 2.

The main parts of the apparatus are an outer container 1, two ejecting receptacles 2 and 3, a let-down (i.e. expansion) vessel 4, a compressed air control slide valve 5 with an associated reversing mechanism, which as a whole is identified with reference numeral 6, a reversing piston 7 for reversing the water flow and two water-jet pumps 8 and 9. Said main parts, and further parts, and the cooperation of the parts of the apparatus will be discussed in detail hereinafter.

Figure 1:
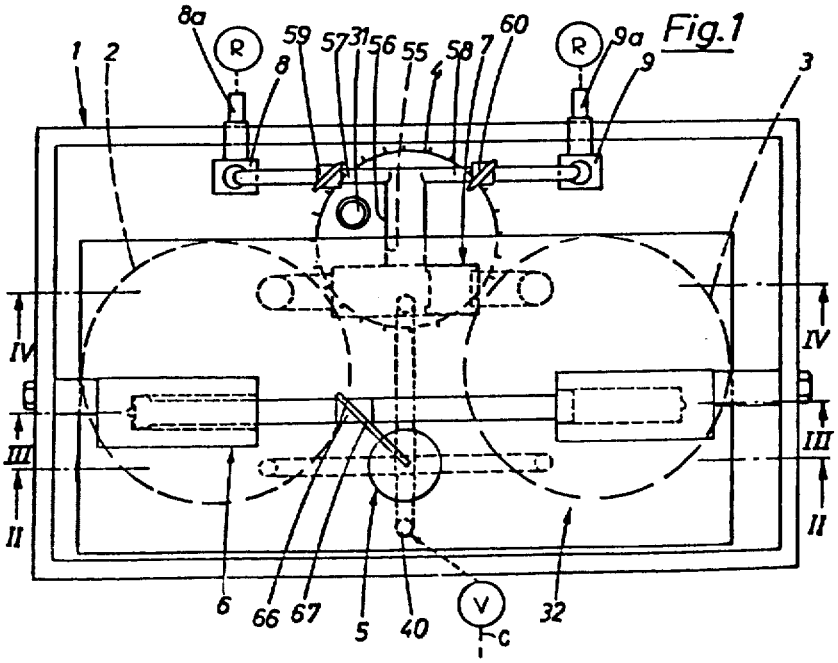
FIG. 1 is a top view of an inventive apparatus.

The outer container 1 has, as is shown in FIG. 1, a rectangular top view and a relatively high height (see FIG. 2) compared with its top view. The outer container can for example be of plastic. Ledges 10, 11 and 12 are built into the box bottom, onto which ledges the receptacles 2, 3 and 4 are mounted, so that said receptacles are spaced from the bottom 13 of the container 1. As is illustrated in FIG. 3, a water-discharge opening 14 is arranged near the bottom 13, which opening is closed off by means of a plug 15.

The ejecting receptacles 2 and 3 have a cylindrical shape and are closed off on top by a lid 16 and on the bottom by a screwed-on bottom 17. Both receptacles are constructed alike and are discussed in connection with the example of the receptacle 2.

A large opening 18 exists in the bottom 17, which opening is closed off by a valve cap 19. The valve cap is pivotal about a horizontal axis 20 and has a packing coating 21. A small edge 22 which surrounds the opening 18 serves as a packing seat for the valve cap.

A float 23 is arranged in each of the receptacles 2 and 3, which float is vertically movable in a cage 24. The cage 24 has holes 24a, so that its inside communicates with the inside 25 of the ejecting cylinder. A conical valve 26 is provided on the upper side of the float 23, which conical valve cooperates with a valve seat 27, which is provided on the lower end of the control pipeline 28, which is guided through the lid 16 into the inside 25 of the ejecting receptacle.

The let-down vessel 4 is of a good heat-conducting material, for example of a rust-free steel, and carries ribs 4a on its outside. Baffle plates are arranged inside of the let-down vessel, which plates are for example cross plates 29 and 30, which force air entering the let-down vessel to detour, so that a sound-muffling effect will occur.

An exhaust pipe 31 which projects upwardly is provided on the ceiling of the let-down vessel 4. The air which is supposed to be expanded is forced through the built-in baffle plates to flow through the let-down vessel first downwardly and then upwardly.

The receptacles 2, 3 and 4 are held in the container by a control plate which as a whole is identified with reference numeral 32. Said control plate lies on the upper sides of the receptacles 2, 3 and 4 and is secured against a lifting upwardly by means of holding elements 33 and 34. Various openings are provided in said control plate. Furthermore the already mentioned rotary slide valve 5 is supported in the control plate. Furthermore the control plate receives the reversing piston 7, as is shown in the cross section of FIG. 4.

The rotary slide valve 5 has a cylindrical member, in which are provided two angular channels 35 and 36 (FIGS. 5 and 6) axially spaced from one another. At the height of the angular channel 35 (FIG. 5) three channels 37, 38 and 39 are arranged in the control plate 32. The channel 38 has a vertical section 38a, which leads to a compressed air connection 40 (FIG. 1). The channel 37 leads from the opening 41, in which the rotary slide valve 5 is supported, through a vertical section 37a into the ejecting receptacle 2. The channel 39 lies symmetrically to the channel 37 and leads into the ejecting receptacle 3.

Figure 5:
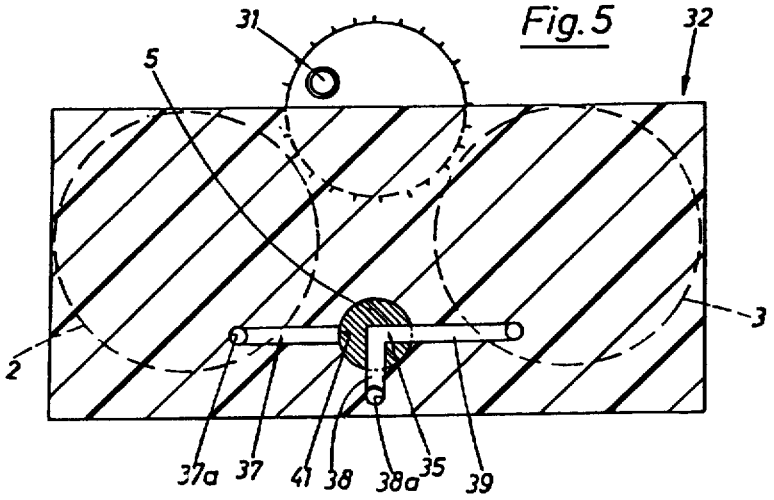
FIG. 5 is a horizontal cross-sectional view along the line V—V of FIG. 2, wherein air channels for supplying of compressed air to ejecting receptacles are included in the cross section.

In the position according to FIG. 5, the compressed air connection 40 communicates with the ejecting receptacle 3. After a rotation of the rotary slide valve 5 in clockwise direction at 90°, the ejecting receptacle 2 is connected to the compressed air connection 40.

Figure 6:
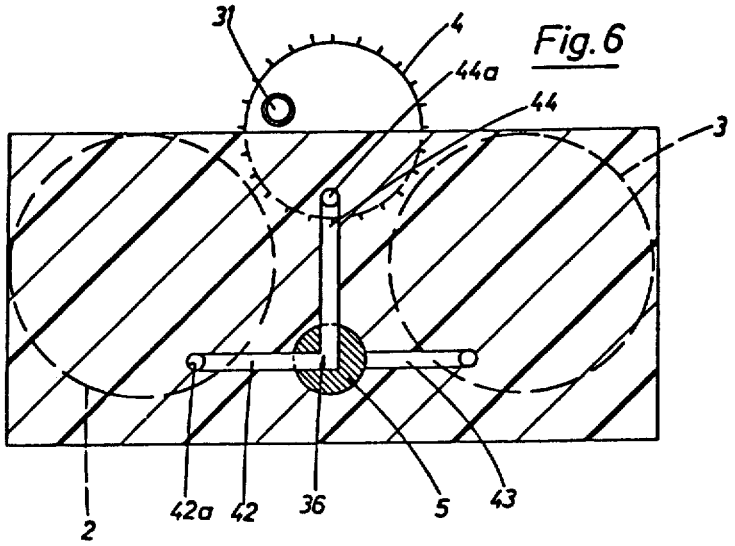
FIG. 6 is a cross-sectional view along the line VI—VI of FIG. 2, wherein the channels for supplying of compressed air from the ejecting receptacles to the let-down vessel are included in the cross section.

In the plane of the angular opening 36 (FIG. 6) there are provided in the control plate three channels 42, 43 and 44. In the position which is illustrated in FIG. 6, the ejecting receptacle 2 is connected through a vertical section 42a of the opening 42, the angular opening 36 in the rotary slide valve 5 and the opening 44, which also has a vertical section 44a, to the let-down vessel 4. After a rotation of the rotary slide valve at 90°, the ejecting receptacle 2 is uncoupled from the let-down vessel 4 and instead the ejecting receptacle 3 is coupled to the let-down vessel 4.

Figure 2:
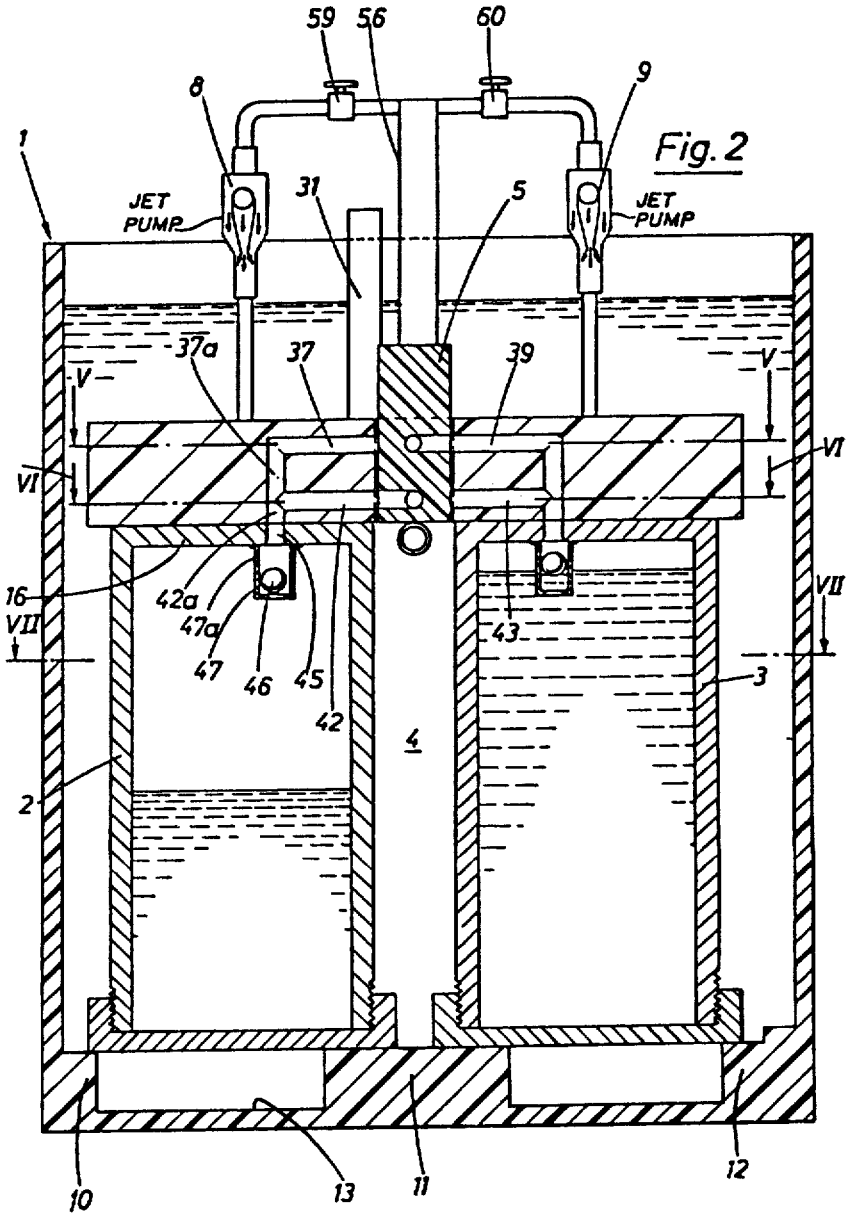
FIG. 2 is a cross-sectional view along the line II—II of FIG. 1, wherein also a control slide valve for compressed air is cut.
Figure 3:
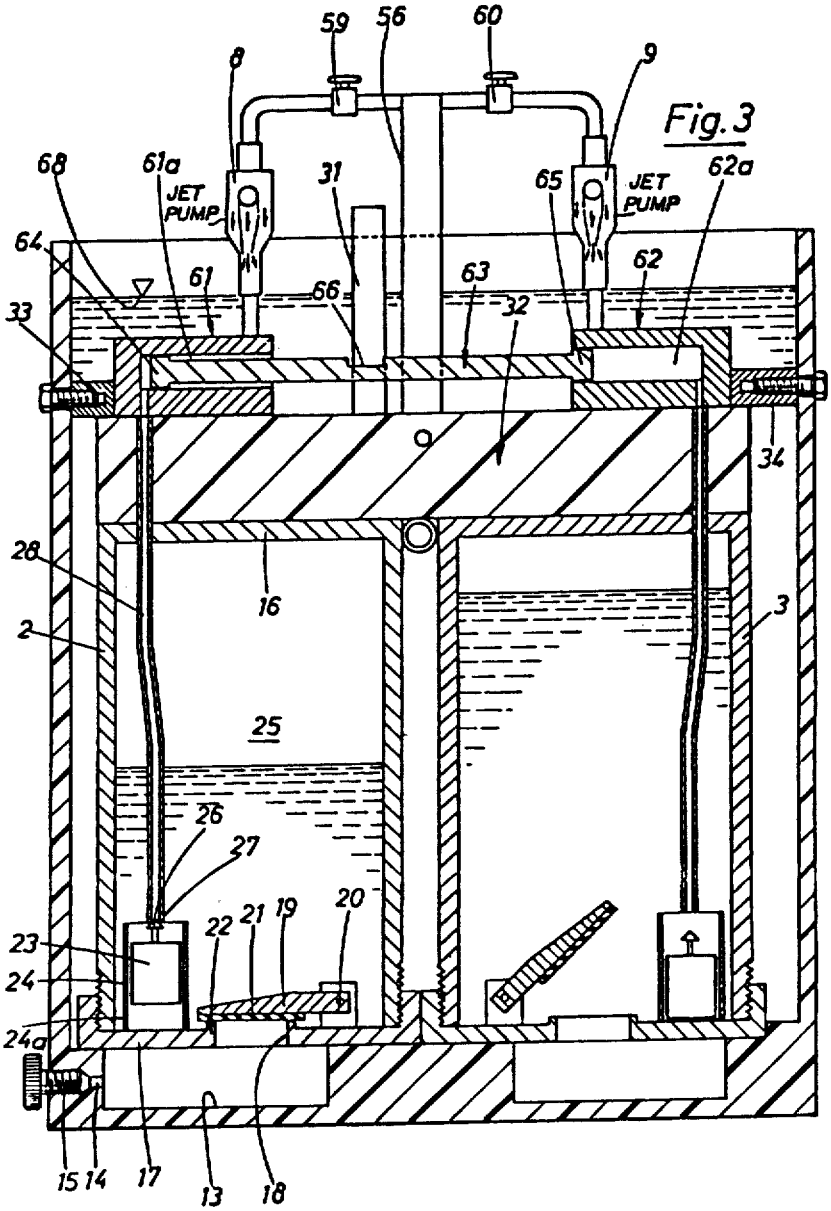
FIG. 3 is a cross-sectional view along the line III—III of FIG. 1, wherein the cross-section plane also intersects the reversing mechanism for the reversal of the compressed air flow.

As one can see from FIG. 2, the openings 37, 39, 42 and 43 lie in the same vertical plane, so that also the mentioned vertical channel sections are in alignment. Said vertical channel sections are aligned with openings 45 in the end surfaces 16 of the ejecting receptacles. Valve balls 46 are provided below said openings, which balls consist of a material which is specifically lighter than water and which are each guided in a cage 47, which has cross bores 47a.

Figure 4:
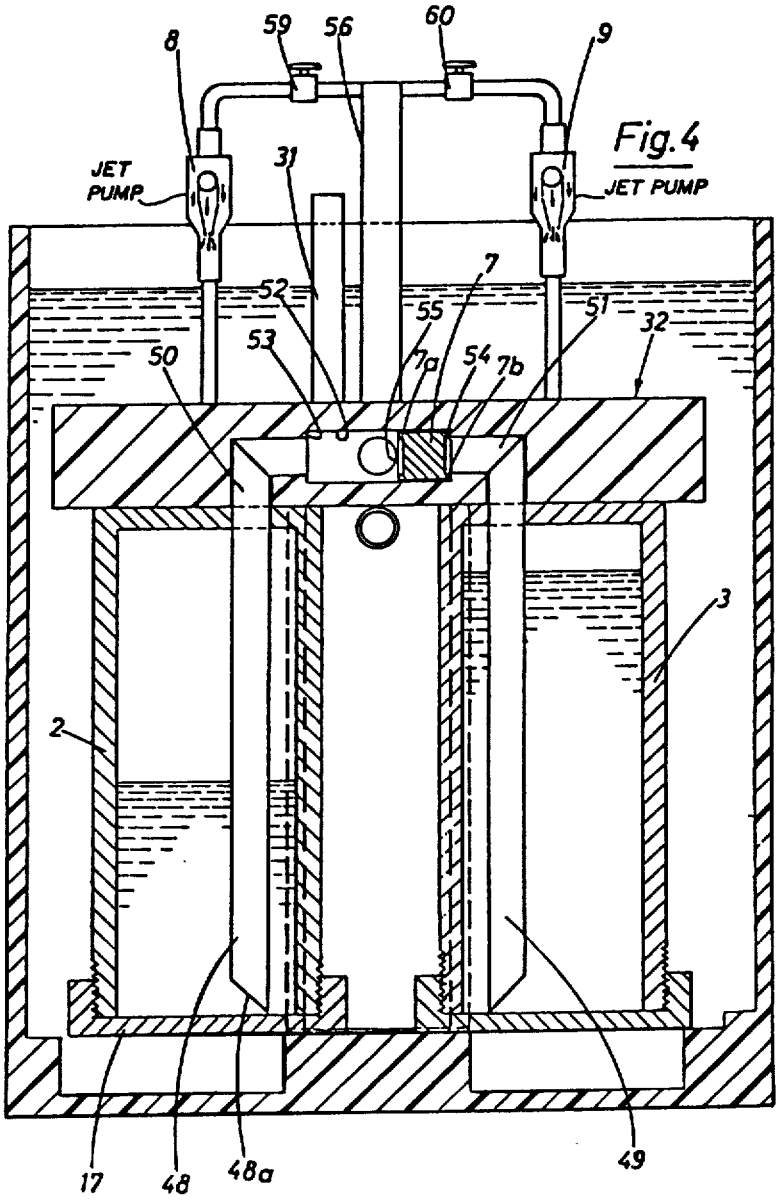
FIG. 4 is a cross-sectional view along the line IV—IV of FIG. 1, wherein also the reversing mechanism for the water flow is included in the cross section.

Standpipes 48 and 49 are arranged in the ejecting receptacles 2 and 3 (see FIG. 4). Said standpipes extend to the bottoms 17 and have sloped areas 48a at their ends. The standpipes 48 and 49 extend fixedly through the lids 16 of the ejecting receptacles and communicate with angular channels 50 and 51 in the control plate 32. The angular channels end axially in a cylinder 52, in which the piston 7 is movable. Valve seats 53 and 54 are provided on the ends of the cylinder 52. The piston 7, which acts at the same time as a valve disk, has packing edges 7a, 7b which can rest against the valve seats 53 and 54. An opening 55 radially ends in the longitudinal center of the cylinder 52, which opening 55 (see FIG. 1) extends to the edge of the control plate 32. A pipeline 56 is connected to the opening 55, which pipeline branches at its end into two pipelines 57 and 58, in which manual valves, or faucets, 59 and 60 are provided. The pipelines 57, 58 lead to the water-jet pumps 8 and 9, on which suction connections 8a and 9a are provided, to which the receptacles which are to be evacuated are connected, for example through flexible hoses (not shown).

Two cylinders 61 and 62 (FIG. 3) are mounted on the control plate 32. The above-mentioned compressed air lines 28 end in communication with the ends of the cylinder bores 61a and 62a. A rod 63 extends between the two cylinders 61 and 62, the ends of which are constructed as pistons 64 and 65, which are fitted into the cylinder bores 61a and 62a. A recess 66 is provided in the center of the rod, into which (see FIG. 1) engages an arm 67, which is connected fixedly to the rotary slide valve 5 and projects radially from the arm.

The apparatus operates as follows:

During the start of the operation, water is first added to fill the outer container 1 up to the level mark 68 (FIG. 3). The connection port 40 for the compressed air supply is, as schematically shown in FIG. 1, connected to a compressed air line C, in which a manual valve V is provided in front of said connection port and initially remains closed. Receptacles R which are to be evacuated are connected to the water-jet pumps 8 and 9 through the connections 8a and 9a. If at least one of the manual valves 59 and 60 is opened, the device starts to operate, when the compressed air valve in front of the connection 40 is opened.

During filling of the outer container 1 with water, the ejecting receptacles 2 and 3 are also filled with water, whereby the valve caps 19 are opened by the static pressure of the water. If the connection to the let-down vessel 4 is opened, which is true for the ejecting receptacle 2, in the valve position shown in FIG. 6, the air contained in the ejecting receptacle can escape and it can fill up completely. Penetration of water into the air channels 37 and 39 is prevented by the valves 46, which through their buoyancy in the water are lifted and pressed against the opening in the cylinder lid 16. The other ejecting receptacle from which the air discharge is not possible, will not be able to fill up completely, since an air cushion remains in said vessel.

It is assumed that (in contrast to the showing in FIG. 5) the position of valve 5 is such that the compressed air flows into the ejecting receptacle 2. The compressed air presses against the liquid surface and moves the water through the standpipe 48 (see FIG. 4) upwardly. The water pressure presses the piston 7 against the valve seat 54 on the right and thus closes off the standpipe 49 of the other ejecting receptacle 3. The water flows through the opening 55 to the water-jet pumps 8 and 9. The water which is emitted by the water-jet pumps falls directly again into the outer container 1.

When the water level in the ejecting receptacle 2 has dropped so far that the float 23 (see FIG. 3) can sink, the lower end of the control line 28 opens and the compressed air, which is for example at an excess pressure of two atmospheres, can flow to the cylinder 61, which causes the rod 63 to be pushed to the right. This rotates the rotary slide valve 5 through 90°, to establish its connections shown in FIGS. 5 and 6. In this position the compressed air flows through the connection piece 40 into the ejecting receptacle 3 and presses against the water surface therein. The water is moved upwardly in the standpipe 49 and first drives the reversing piston 7 to the left, whereby the packing edge 7a is set on the seat 53 and thus closes off the standpipe 48. In this position, water is moved from the ejecting receptacle 3 through the opening 55 to the water-jet pumps.

At the same time, as is illustrated in FIG. 6, a connection opens between the ejecting receptacle 2 and the let-down vessel 4 through the channels 42, 36 and 44. The compressed air, which at the moment of the changing over is still under its full pressure of two atmospheres excess pressure (a releasing of the compressed air does not take place during ejection), now expands into the let-down vessel 4, whereby a strong cooling of the air occurs. At the same time, air noise is reduced through the sound-muffling effect of the let-down vessel 4. The cold air absorbs heat from the water which washes totally around the receptacle 4, which causes the water to be kept at a low temperature. The expanded air is discharged through the pipe 31.

If in the ejecting receptacle 3 the water level has dropped so far that the float 23 therein drops, the cylinder 62 is placed under pressure and the rod 63 is pushed to the left, after which again exists the situation at the beginning of the above-described operating sequence. Thus, while water is driven out of an ejecting receptacle with the help of compressed air, the other ejecting receptacle is filled through its bottom 17 due to the static pressure which exists in the outer container 1. The supply openings 18 are chosen large, in order to assure a complete filling of the emptied ejecting receptacle at the relatively low static pressure, prior to emptying of the ejecting receptacle which under pressure is being emptied.

It is sufficient for short interruptions in the operation to shut off the faucets 59 and 60. It is advantageous during a longer pause in the operation to also shut off the compressed air supply to connection 40.

To empty the device, the water-discharge screw 15 is loosened during operation. The ejecting receptacles 2 and 3 are then pumped empty automatically. A continuous water change is not needed, since the water is being cooled at all times. Because of unavoidable contaminations, it is advantageous to change one time per day the water fill, which can be for example approximately 25 liters.

Figure 8:
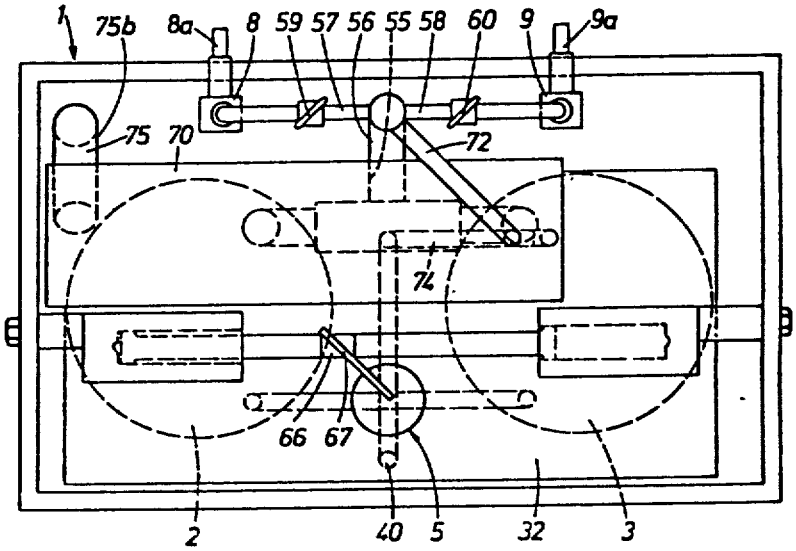
FIG. 8 is a view which corresponds with FIG. 1, but of a modified embodiment in which the let-down vessel is arranged above the water filling.
Figure 9:
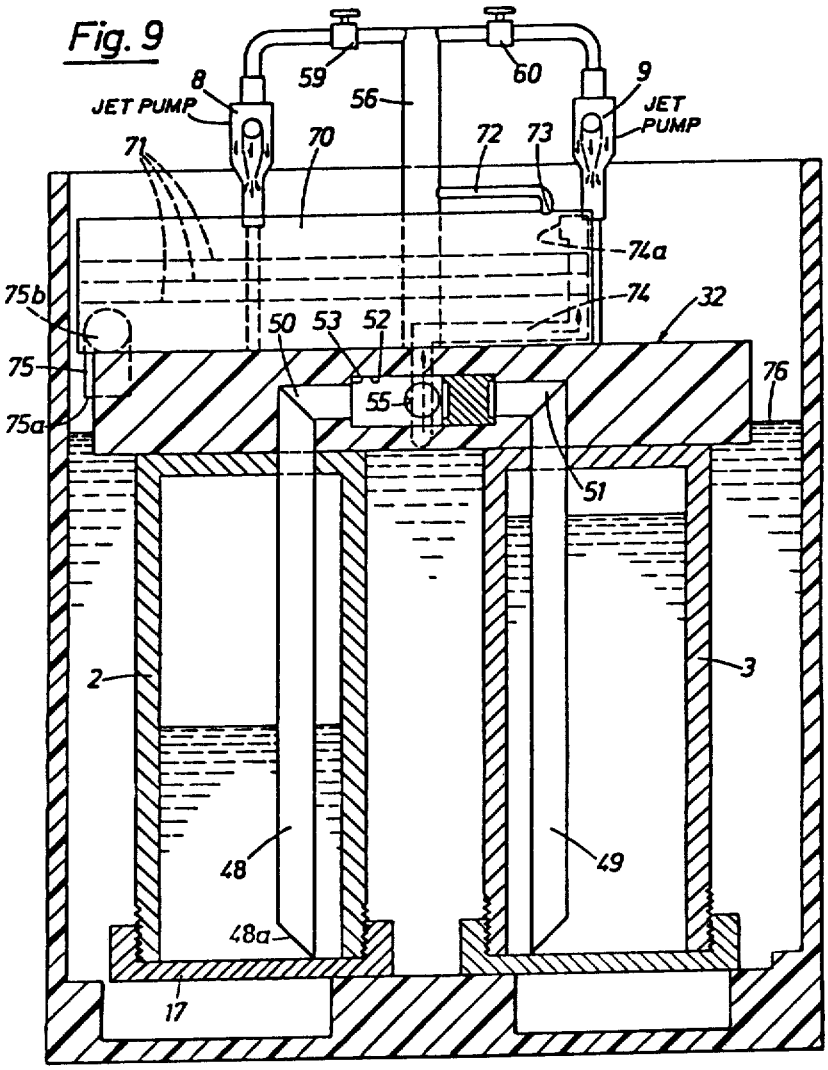
FIG. 9 is a view which corresponds to FIG. 4, but of the embodiment according to FIG. 8.

In the embodiment according to FIGS. 8 and 9, the let-down vessel, which is here identified as a whole by reference numeral 70, is arranged horizontally above the water level. The let-down vessel 70 is a cylindrical container, which can be of a metal. Perforated sheet metal plates 71 are arranged in said vessel 70, of which plates some are illustrated in FIG. 9.

A water line 72 is connected to the end of the vessel 70, which end is on the right in the drawing. The water line 72 branches off from pressure line 56 which leads to the water-jet pumps. The water line 72 ends by means of a nozzle 73 in the vessel 70. The jet direction of the nozzle 73 is directed at a right angle to the longitudinal direction of the vessel 70 and downwardly.

The air which exits from the ejecting receptacles 2, 3 is introduced into the vessel 70 through a line 74. The line 74 has an outlet opening 74a, the axis of which extends parallel to the longitudinal direction of the vessel 70 and is arranged below the water-supply nozzle 73, but is laterally offset slightly to the right from same.

The device according to FIGS. 8 and 9 operates substantially in the same manner as the device according to FIGS. 1 to 7. The main difference is that water is introduced into the let-down vessel 70. The water is divided finely during spraying in under pressure, through tearing apart of the jet and through the impact onto the baffle plates 71. A further division and distribution in the entire let-down vessel is effected by the air blasts which exit from the air-line port 74a. The water is distributed on the perforated sheet-metal plates 71, which thus generally are coated by a film of water. The water is ejected from the vessel 70 together with the air, through an exhaust line 75. The outlet 75a of the exhaust line 75 ends above the water level 76 in the surrounding area and is directed downwardly. Thus, in this embodiment the water level lies slightly lower than in the embodiment of FIGS. 1 to 7. A horizontal part 75b of the exhaust line 75 extends through the wall of the vessel 70 at the lowest point therein. This assures that no water can accumulate in the vessel 70.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A method for the operation of a water-jet pump, in which the water which is needed for the operation of the pump is recirculated in a cycle, in which the improvement comprises pressurizing the water by means of compressed air at a substantially constant air pressure, the compressed air driving the water through the water-jet pump, and expanding the compressed air in a defined let-down space, wherein heat is withdrawn from the water, which heat is absorbed by the air during and after its expansion.

2. A method according to claim 1, wherein the water flows around the defined let-down space.

3. A method according to claim 1, wherein the expanding air contacts the water directly.

4. A method according to claim 3, wherein the air and water are both introduced into the defined let-down space.

5. A method according to claim 1, wherein at least two ejecting chambers are filled alternately with compressed air, wherein during the filling of a said chamber with air, water therein is compressed and driven from said chamber to said water-jet pump and wherein air which is contained in the other ejecting chamber is expanded in the let-down space.

6. An apparatus for operating a water-jet pump, comprising at least two ejecting receptacles, connection water channels which connect the ejecting receptacles to the water-jet pump, at least one let-down vessel, first connection air channels which connect the ejecting receptacles to the let-down vessel, a compressed air connection for supplying compressed air, further connection air channels which connect the compressed air connection to the ejecting receptacles, first water valve means for effecting alternate fluid connection of the ejecting receptacles to the water-jet pump through the connection water channels, second water valve means for effecting fluid connection of the ejecting receptacles to the water which is discharged from the water-jet pump, first compressed air valve means for effecting alternate fluid connection of the ejecting receptacles to the compressed air connection through the further connection air channels and second compressed air valve means for effecting alternate fluid connection of the ejecting receptacles to the let-down vessel through the first connection air channels.

7. An apparatus according to claim 6, wherein the ejecting receptacles and the let-down vessel are arranged in an outer container, which is taller than the ejecting receptacles and which can be filled with water, and wherein the discharge side of the water-jet pump ends in the outer container and the ejecting receptacles each have in the area of their bottom a flow connection, which leads to the inside of the outer container and can be closed off by the second water valve means.

8. An apparatus according to claim 7, wherein the second water valve means includes check valves.

9. An apparatus according to claim 6, wherein the first water valve means is controlled by the water exiting from the ejecting receptacles.

10. An apparatus according to claim 9, wherein said first water valve means includes a piston which slides in a cylindrical chamber, the ends of the chamber being connected by first portions of said connection water channels to the ejecting receptacles and a portion of the chamber intermediate its ends being connected by a further portion of said connection water channels to the water-jet pump, the piston in each end position closing off a respective one of the first channel portions but leaving the further channel portion in fluid connection with the other first channel portion.

11. An apparatus according to claim 6, wherein said connection water channels include standpipes arranged in the ejecting receptacles, which standpipes end near the bottom of the ejecting receptacles.

12. An apparatus according to claim 6, wherein the further air connection channels for the introduction of compressed air into the ejecting receptacles end in the upper area of the ejecting receptacles.

13. An apparatus according to claim 6, including reversing means responsive to the compressed air in the ejecting receptacles for operating the first and second compressed air valve means after one said ejecting receptacle is filled with air to connect the compressed air connection to the other said ejecting receptacle and said one ejecting receptacle to the let-down vessel.

14. An apparatus according to claim 13, including near the bottom of each ejecting receptacle a float valve which closes off an air channel when its floating member is submerged into the water, which air channel leads to said reversing means.

15. An apparatus according to claim 6, wherein the first and second compressed air valve means respectively include first and second compressed air valves which are constructed as rotary slide valves.

16. An apparatus according to claim 15, wherein the first and second compressed air valves are provided in a single rotary slide valve member which is rotatably supported in a housing, wherein the single rotary slide valve member has, in a first plane, openings for the first compressed air valve and, in a second plane which is provided at an axial distance from the first plane, further openings for the second compressed air valve, said openings cooperating with additional openings which are arranged in spaced planes in the rotary slide valve housing.

17. An apparatus according to claim 16, including reversing means responsive to air pressure in the ejecting receptacles for effecting rotational movement of the rotary slide valve member.

18. An apparatus according to claim 17, including a radially projecting pin on the rotary slide valve member, which pin is operatively engaged by the reversing means.

19. An apparatus according to claim 6, including a control plate which rests on the ejecting receptacles and the let-down vessel and is secured against lifting off in an upward direction, and which contains the first and second compressed air valve means and at least a portion of the first and second compressed air connection channels.

20. An apparatus according to claim 7, wherein the water-jet pump is arranged on a wall of the outer container and discharges directly into the outer container.

21. An apparatus according to claim 7, wherein the let-down vessel is arranged above the water fill level of the outer container, is connected by at least one water channel to at least one ejecting receptacle and has an outlet opening at its lowest point for the discharge of a water/air mixture.

22. An apparatus according to claim 21, wherein the outlet opening for the discharge of the water/air mixture from the let-down vessel lies above the water level in the outer container.

23. An apparatus according to claim 21, wherein for the introduction of the water into the let-down vessel there is provided a nozzle, the jet direction of which is oriented at an angle to the axis of the opening into the let-down vessel for the first air connection channels.

24. An apparatus according to claim 6, wherein the let-down vessel contains baffle plates.

* * * * *